(12) United States Patent
Jiang et al.

(10) Patent No.: US 11,776,241 B1
(45) Date of Patent: Oct. 3, 2023

(54) METHOD AND SYSTEM FOR GENERATING ADVERSARIAL ATTACKS ON VIDEO RECOGNITION MODELS

(71) Applicant: Fudan University, Shanghai (CN)

(72) Inventors: Yu-gang Jiang, Shanghai (CN); Kai Chen, Shanghai (CN); Jingjing Chen, Shanghai (CN); Zhipeng Wei, Shanghai (CN); Zuxuan Wu, Shanghai (CN)

(73) Assignee: Fudan University, Shanghai (CN)

( * ) Notice: Subject to any disclaimer, the term of this patent is extended or adjusted under 35 U.S.C. 154(b) by 0 days.

(21) Appl. No.: 17/937,315

(22) Filed: Sep. 30, 2022

(51) Int. Cl.
```
G06V 10/774      (2022.01)
G06V 10/778      (2022.01)
G06V 10/82       (2022.01)
G06V 20/40       (2022.01)
```

(52) U.S. Cl.
CPC .......... *G06V 10/774* (2022.01); *G06V 10/778* (2022.01); *G06V 10/82* (2022.01); *G06V 20/40* (2022.01)

(58) Field of Classification Search
None
See application file for complete search history.

(56) References Cited

U.S. PATENT DOCUMENTS

2022/0358225 A1* 11/2022 Gadde ................... G06F 40/295

OTHER PUBLICATIONS

Kai Chen et al "Attacking Video Recognition Models with Bullet-Screen Comments", Fudan University, 2022 (Year: 2022).*
Tom B. Brown et al.; Adversarial Patch; arXiv:1712.09665v2 [cs.CV] May 17, 2018; 31st Conference on Neural Information Processing Systems (NIPS 2017), Long Beach, CA, USA; p. 6.
Xiaojun Jia et al.; Adv-watermark: A Novel Watermark Perturbation for Adversarial Examples; Poster Session B1: Deep Learning for Multimedia; MM '20, Oct. 12-16, 2020, Seattle, WA, USA; 2020 Association for Computing Machinery; pp. 1579-1587.
Zhikai Chen et al.; Appending Adversarial Frames for Universal Video Attack; WACV 2021; Computer Vision Foundation; pp. 3199-3208.
Anurag Ranjan et al.; Attacking Optical Flow; ICCV; Computer Vision Foundation; pp. 2404-2413.
Linxi Jiang et al.; Black-box Adversarial Attacks on Video Recognition Models; Session 2C: Captioning & Video Analysis; MM '19, Oct. 21-25, 2019, Nice, France; 2019 Association for Computing Machinery; pp. 864-872.

(Continued)

*Primary Examiner* — Leon Flores
(74) *Attorney, Agent, or Firm* — Brad Bertoglio; Intelink Law Group, P.C.

(57) ABSTRACT

A method for generating adversarial attacks on a video recognition model is disclosed, including (a) generating the content of bullet-screen comments (BSCs) by an image captioning model for a clean video sample; (b) generating an adversarial video sample by inserting the BSCs into the clean video sample; (c) using the adversarial video sample to attack the video recognition model; (d) receiving rewards from the environment; (e) optimizing the position and transparency of BSCs by an reinforced learning (RL) agent according to the received rewards; (f) updating the adversarial video sample and using it to attack the video recognition model; and iteratively repeating steps of (d)-(f), until a predefined condition is matched.

20 Claims, 2 Drawing Sheets
(2 of 2 Drawing Sheet(s) Filed in Color)

(56) References Cited

OTHER PUBLICATIONS

Andrew Ilyas et al.; Black-box Adversarial Attacks with Limited Queries and Information; 35 th International Conference on Machine Learning, Stockholm, Sweden, PMLR 80, 2018; p. 10.
Zhipeng Wei et al.; Boosting the Transferability of Video Adversarial Examples via Temporal Translation; The Thirty-Sixth AAAI Conference on Artificial Intelligence (AAAI-22); Association for the Advancement of Artificial Intelligence (www.aaai.org); pp. 2657-2667.
Kensho Hara et al.; Can Spatiotemporal 3D CNNs Retrace the History of 2D CNNs and ImageNet?; CVPR; Computer Vision Foundation; pp. 6546-6555.
Ziwei Yang et al.; Catching the Temporal Regions-of-Interest for Video Captioning; MM'17, Oct. 23-27, 2017, Mountain View, CA, USA; 2017 Association for Computing Machinery; pp. 146-153.
Ping-yeh Chiang et al.; Certified Defenses for Adversarial Patches; Published as a conference paper at ICLR 2020; pp. 16.
Zhipeng Wei et al.; Cross-Modal Transferable Adversarial Attacks from Images to Videos; CVPR; Computer Vision Foundation; pp. 15064-15073.
Bo Shen et al.; DCT Domain Alpha Blending; 1998 IEEE; pp. 857-861.
Ian J. Goodfellow et al.; Explaining and Adversarial Examples; ICLR 2015; pp. 01-11.
Ning Han et al.; Fine-grained Cross-modal Alignment Network for Text-Video Retrieval; Session 27: Multimedia Search and Recommendation-I; MM '21, Oct. 20-24, 2021, Virtual Event, China; 2021 Association for Computing Machinery; pp. 3826-3834.
Ramprasaath R. Selvaraju et al.; Grad-CAM: Visual Explanations from Deep Networks via Gradient-based Localization; ICCV; Computer Vision Foundation; pp. 618-626.
H. Kuehne et al.; HMDB: A Large Video Database for Human Motion Recognition; 2011 IEEE International Conference an Computer Vision; pp. 2556-2563.
Christian Szegedy et al.; Intriguing properties of neural networks; arXiv:1312.6199v4 [cs.CV] Feb. 19, 2014; pp. 1-10.
Andrej Karpathy et al.; Large-scale Video Classification with Convolutional Neural Networks; CVPR 2014; Computer Vision Foundation; p. 8.
Wenguan Wang et al.; Learning Unsupervised Video Object Segmentation through Visual Attention; CVPR; Computer Vision Foundation; p. 8.
Muzammal Naseer et al.; Local Gradients Smoothing: Defense against localized adversarial attacks; 2019 IEEE Winter Conference on Applications of Computer Vision; pp. 1300-1307.
Jeff Donahue et al.; Long-term Recurrent Convolutional Networks for Visual Recognition and Description; CVPR 2014; Computer Vision Foundation; pp. 2625-2634.
Alhussein Fawzi et al.; Measuring the effect of nuisance variables on classifiers; 2016. The copyright of this document resides with its authors; pp. 1-10.
Tsung-Yi Lin et al.; Microsoft COCO: Common Objects in Context; D. Fleet et al. (Eds.): ECCV 2014, Part V, LNCS 8693, pp. 740-755, 2014; Springer International Publishing Switzerland 2014; pp. 740-755.
Hu Zhang et al.; Motion-Excited Sampler: Video Adversarial Attack with Sparked Prior; p. 17.
Zuxuan Wu et al.; Multi-Stream Multi-Class Fusion of Deep Networks for Video Classification; MM '16, Oct. 15-19, 2016, Amsterdam, Netherlands; DOI: http://dx.doi.org/10.1145/2964284.2964328; pp. 791-800.
Chenglin Yang et al.; PatchAttack: A Black-box Texture-based with Reinforcement Learning; pp. 1-17.
Aishan Liu et al.; Perceptual-Sensitive GAN for Generating Adversarial Patches; The Thirty-Third AAAI Conference on Artificial Intelligence (AAAI-19); 2019, Association for the Advancement of Artificial Intelligence (www.aaai.org); pp. 1028-1035.
Joao Carreira et al.; Quo Vadis, Action Recognition? A New Model and the Kinetics Dataset; CVPR; Computer Vision Foundation; pp. 6299-6308.
Christian Szegedy et al.; Rethinking the Inception Architecture for Computer Vision; CVPR; Computer Vision Foundation; pp. 2818-2826.
David Nilsson et al.; Semantic Video Segmentation by Gated Recurrent Flow Propagation; CVPR; Computer Vision Foundation; pp. 6819-6828.
Kelvin Xu et al.; Show, Attend and Tell: Neural Image Caption Generation with Visual Attention; 32nd International Conference on Machine Learning, Lille, France, 2015. JMLR: W&CP vol. 37; pp. 10.
Sheng Liu et al.; SibNet: Sibling Convolutional Encoder for Video Captioning; Session: Multimodal-2 (Cross-Modal Translation); MM'18, Oct. 22-26, 2018, Seoul, Republic of Korea; Association for Computing Machinery; pp. 1425-1434.
Christoph Feichtenhofer et al.; SlowFast Networks for Video Recognition; ICCV; Computer Vision Foundation; pp. 6202-6211.
Xingxing Wei et al.; Sparse Adversarial Perturbations for Videos; The Thirty-Third AAAI Conference on Artificial Intelligence (AAAI-19); 2019, Association for the Advancement of Artificial Intelligence (www.aaai.org); pp. 8973-8980.
Xue Song et al.; Spatial-Temporal Graphs for Cross-Modal Text2Video Retrieval; IEEE Transactions On Multimedia, vol. 24, 2022; pp. 2914-2923.
Shasha Li et al.; Stealthy Adversarial Perturbations Against Real-Time Video Classification Systems; Network and Distributed Systems Security (NDSS) Symposium 2019 Feb. 24-27, 2019, San Diego, CA, USA; www.ndss-symposium.org; pp. 15.
Will Kay et al.; The Kinetics Human Action Video Dataset; arXiv:1705.06950v1 [cs.CV] May 19, 2017; pp. 1-22.
Aleksandar Makelov et al.; Towards Deep Learning Models Resistant To Adversarial Attacks; ICLR 2018; pp. 1-23.
Nicholas Carlini et al.; Towards Evaluating the Robustness of Neural Networks; 2017 IEEE Symposium on Security and Privacy; 2017, Nicholas Carlini. Under license to IEEE; pp. 39-57.
Zhipeng Wei et al.; Towards Transferable Adversarial Attacks on Vision Transformers; The Thirty-Sixth AAAI Conference on Artificial Intelligence (AAAI-22); Association for the Advancement of Artificial Intelligence (www.aaai.org); pp. 2668-2676.
Zixuan Su et al.; Video Relation Detection via Multiple Hypothesis Association; Poster Session F2: Media Interpretation & Mobile Multimedia; MM '20, Oct. 12-16, 2020, Seattle, WA, USA; Association for Computing Machinery; pp. 3127-3135.
Xing Zhang et al.; VideoLT: Large-scale Long-tailed Video Recognition; ICCV; Computer Vision Foundation; pp. 7960-7969.
Zheng Wang et al.; Visual Co-Occurrence Alignment Learning for Weakly-Supervised Video Moment Retrieval; Poster Session 2; MM '21, Oct. 20-24, 2021, Virtual Event, China; 2021 Association for Computing Machinery; pp. 1459-1468.
Yucheng Shi, Yahong Han et al.; Decision-based Black-box Attack Against Vision Transformers via Patch-wise Adversarial Removal; arXiv:2112.03492v2 [cs CV] Sep. 15, 2022; p. 16.
David J. Wales et al.; Global Optimization by Basin-Hopping and the Lowest Energy Structures of Lennard-Jones Clusters Containing up to 110 Atoms; J. Phys. Chem. A 1997, 101, 5111-5116; Abstract published in Advance ACS Abstracts, Jun. 15, 1997; 1997 American Chemical Society.
Ronald J. Williams; Simple Statistical Gradient-Following Algorithms for Connectionist Reinforcement Learning Machine Learning, 8, 229-256 (1992); 1992 Kluwer Academic Publishers, Boston Manufactured in The Netherlands.
Danying Su et al.; UCF-101, A Novel Omi/HtrA2 Inhibitor, Protects Against Cerebral Ischemia/Reperfusion Injury in Rats; The Anatomical Record 292:854-861 (2009); 2009 Wiley-Liss, Inc.
Pin-Yu Chen et al.; ZOO: Zeroth Order Optimization Based Black-box Attacks to Deep Neural Networks without Training Substitute Models; Session: Deep Learning; AISec'17, Nov. 3, 2017, Dallas, TX, USA; pp. 15-26.

\* cited by examiner

METHOD AND SYSTEM FOR GENERATING ADVERSARIAL ATTACKS ON VIDEO RECOGNITION MODELS

TECHNICAL FIELD

This invention is related to a method for generating adversarial attacks on video recognition models, especially for generating adversarial attacks on video recognition models with bullet-screen comments (BSC). This invention is also related to a system thereof.

BACKGROUND

Deep Neural Networks (DNNs) have demonstrated superior performance in various video-related tasks, like video recognition, video caption and video segmentation, etc. However, recent works have shown that DNNs are extremely vulnerable to video adversarial examples which are generated by applying negligible perturbations to clean input samples. The existence of video adversarial examples leads to security concerns of Deep Learning-based video models in real-world applications. Therefore, it has attracted increasing research interest in recent years.

Nevertheless, most of the existing works focus on perturbation-based attacks, which introduce imperceptible changes to the clean input samples. The perturbations are constrained to have a small Lp norm and applied to the whole input. While perturbation-based attacks have been demonstrated to be effective in attacking the video recognition models, they are typically difficult to apply in the physical world. In contrast, patch-based attacks generate adversarial patches by modifying the pixels within a restricted region without any limitations on the range of changes. Therefore, patch-based attacks are stronger and more effective in the physical world. Nevertheless, existing works on patch based attacks are mostly focused on images, patch-based attacks on videos have seldom been explored.

Perturbation-based attacks on image models are firstly explored by Szegedy et al. (Szegedy et al., "Intriguing properties of neural networks", arXiv preprint arXiv: 1312.6199, 2013), where they add some imperceptible noises on clean images and mislead well-trained image classification models successfully. Sparked by this work, perturbation-based attacks on image models have been extensively studied.

In the past years, perturbation-based attacks have been extended to video models. In terms of white-box attacks, where the adversary has complete access to the target model such as model parameters, model structure, etc, (Wei et al., "Sparse adversarial perturbations for videos", AAAI Conference on Artificial Intelligence, 2019) first proposes an L2,1 norm regularization-based optimization algorithm to compute sparse adversarial perturbations for videos. (Li et al., "Stealthy Adversarial Perturbations Against Real-Time Video Classification Systems", NDSS, 2019) leverages Generative Adversarial Network (GAN) to generate universal perturbations offline against real-time video classification systems, and the perturbations work on unseen inputs. (Chen et al., "Appending adversarial frames for universal video attack", IEEE/CVF Winter Conference on Applications of Computer Vision, 2021) proposes to append a few dummy frames to a video clip and then add adversarial perturbations only on these new frames.

For black-box attacks, (Jiang et al., "Black-box adversarial attacks on video recognition models", 27th ACM International Conference on Multimedia, 2019) first utilizes tentative perturbations transferred from the image classification model and partition-based rectifications estimated by the Natural Evolutionary Strategies to obtain good adversarial gradient estimates with fewer queries to the target model. To boost the attack efficiency and reduce the query numbers, (Wei et al., "Heuristic black-box adversarial attacks on video recognition models", AAAI Conference on Artificial Intelligence, 2020) proposes to heuristically search a subset of frames and adversarial perturbations are only generated on the salient regions of selected frames. More recently, (Zhang et al., "Motion-Excited Sampler: Video Adversarial Attack with Sparked Prior", arXiv preprint arXiv:2003.07637, 2020) proposes a motion-excited sampler to generate sparked prior and obtain significantly better attack performance. However, black-box perturbation-based attacks often require lots of queries and are difficult to apply in the physical world.

Patch-based attacks on videos in the black-box setting is also investigated, where the adversary can only access the output of the target model. The challenges mainly come from two aspects. First, a video is a sequence of images on which the adjacent frames are closely correlated. If selecting several frames in the video as in the case of perturbation-based video attacks to add adversarial patches, it will increase the perceptibility of the attack. Second, compared to images, the dimension of videos is much higher. If attaching adversarial patches to each frame of the video, it will significantly increase the computation cost. Hence how to efficiently generate inconspicuous adversarial patches for video models in the blackbox setting is the main challenge.

Patch-based attacks superimpose adversarial patches onto a small region of the input to create the adversarial example, making the attack more effective and applicable in the physical world by breaking the Lp norm limitations in perturbation-based attacks. At present, patch-based attacks are mainly focused on image models. Adversarial patches are first proposed by (Brown et al., "Adversarial patch", arXiv preprint arXiv:1712.09665, 2017), which fools image classification models to ignore other scenery semantics and make wrong predictions by superimposing a relatively small patch onto the image. (Fawzi and Frossard, "Measuring the effect of nuisance variables on classifiers", British Machine Vision Conference (BMVC), 2016) introduces the first black-box attack, which searches the position and shape of rectangular patches using Metropolis-Hastings sampling. (Ranjan et al., "Attacking optical flow", IEEE/CVF International Conference on Computer Vision, 2019) further extends adversarial patches to optical flow networks and shows that such attacks can compromise their performance. Although these existing adversarial patches have powerful attack ability, they are highly conspicuous. To make adversarial patches be more inconspicuous, Liu et al. ("Perceptual-sensitive gan for generating adversarial patches", AAAI conference on artificial intelligence, 2019) introduces GAN to generate visually more natural patches. Jia et al. ("Adv-watermark: A Novel Watermark Perturbation for Adversarial Examples", 28th ACM International Conference on Multimedia 2020) further proposes to camouflage malicious information as watermarks to achieve adversarial stealthiness. This approach assumes that people's understanding of the image content is not affected by such meaningful perturbations and hence will not arouse people's suspicion.

However, there is a need for a new and improved approach for generating adversarial attacks on video recognition models.

SUMMARY

To address the aforementioned challenges, in this invention it is proposed a novel adversarial bullet-screen comment (BSC) attack approach against video recognition models. In contrast to the prior art, here the adversarial patches are disguised as BSCs to attack video recognition models. As BSCs are meaningful and quite common, people will be less sensitive to such type of adversarial patch, such that few BSCs can not only attack the video model easily but also don't arouse people's suspicion. The attacking process is formulated as an Reinforcement Learning (RL) problem, where the agent is trained to superimpose BSCs onto the videos in order to induce misclassification.

Specifically, in one aspect of this invention, it is proposed a method for generating adversarial attacks on a video recognition model, including (a) generating the content of bullet-screen comments (BSCs) by an image captioning model for a clean video sample;

(b) generating an adversarial video sample by inserting the BSCs into the clean video sample;

(c) using the adversarial video sample to attack the video recognition model;

(d) receiving fooling rate from the video recognition model and Intersection over Union (IoU) between different BSCs;

(e) optimizing the position and transparency of BSCs by an reinforced learning (RL) agent according to the received fooling rate and IoU;

(f) updating the adversarial video sample and using it to attack the video recognition model;

iteratively repeating steps of (d)-(f), until the IoU between the BSCs in the adversarial video sample equals to 0.

Preferably, the BSCs are confined to a sequence of regions within the video frames of the clean video sample.

Preferably, the position of each of the BSCs are defined by a horizontal coordinate, a vertical coordinate, a font size, and a font type of the respective BSC.

Preferably, the generation of adversarial video sample is only related to the position and transparency of BSCs, other than the color and rotation of BSCs.

Preferably, the agent is trained to sequentially search the position and transparency of BSCs.

Preferably, the IoU constrains the overlap between the BSCs, as well as the number of BSCs, by regarding adversarial examples with overlapping BSCs as failures.

Preferably, the agent is a combination of a Long-Short Term Memory network (LSTM) and a fully connected (FC) layer.

Preferably, the agent is set as a LSTM topped with a FC layer.

In another aspect of this invention, it is proposed a method for generating adversarial attacks on a video recognition model, including (a) generating the content of bullet-screen comments (BSCs) by an image captioning model for a clean video sample;

(b) generating an adversarial video sample by inserting the BSCs into the clean video sample;

(c) using the adversarial video sample to attack the video recognition model;

(d) receiving rewards from the environment;

(e) optimizing the position and transparency of BSCs by a reinforced learning (RL) agent according to the received rewards;

(f) updating the adversarial video sample and using it to attack the video recognition model;

iteratively repeating steps of (d)-(f), until a predefined condition is matched.

Preferably, the agent learns to optimize the position and transparency of adversarial BSCs by interacting with the environment and updating the agent's actions to maximize the total expected reward.

Preferably, the rewards from the environment includes the feedback from the video recognition model, and the Intersection over Union (IoU) between different BSCs Preferably, the feedback from the video recognition model is the fooling rate.

In a further aspect of this invention, it is proposed a system for generating adversarial attacks on a video recognition model, including a content generating module generating the content of bullet-screen comments (BSCs) by an image captioning model for a clean video sample;

an adversarial video sample generating module generating an adversarial video sample by inserting the BSCs into the clean video sample; and an iterative attacking module iteratively repeating steps as follows:

attacking the video recognition model by using the adversarial video sample;

receiving fooling rate from the video recognition model and Intersection over Union (IoU) between different BSCs;

optimizing the position and transparency of BSCs by an reinforced learning (RL) agent according to the received fooling rate and IoU;

updating the adversarial video sample;

wherein the iterative attacking module repeating the above steps until the IoU between the BSCs in the adversarial video sample equals to 0.

In yet another aspect of this invention, it is proposed a system for generating adversarial attacks on a video recognition model, including a content generating module generating the content of bullet-screen comments (BSCs) by an image captioning model for a clean video sample;

an adversarial video sample generating module generating an adversarial video sample by inserting the BSCs into the clean video sample;

an iterative attacking module iteratively repeating steps as follows:

attacking the video recognition model by using the adversarial video sample;

receiving rewards from the environment;

optimizing the position and transparency of BSCs by an reinforced learning (RL) agent according to the received rewards;

updating the adversarial video sample and using it to attack the video recognition model;

wherein the iterative attacking module repeating the above steps until a predefined condition is matched.

Generally speaking, a novel BSC attack approach against video recognition models is proposed of this invention, which achieves an efficient query by formulating the attacking process with RL; and a novel reward function that considers the IoU between BSCs is also proposed, to ensure that the added few BSCs do not affect the understanding of videos. It is demonstrated that compared with the previous PatchAttack, the BSC attack achieves a higher fooling rate while requires fewer queries and occludes smaller areas in the video. Moreover, it is also demonstrated that BSCs still have a higher fooling rate than the same area square patch against the LGS defense method.

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
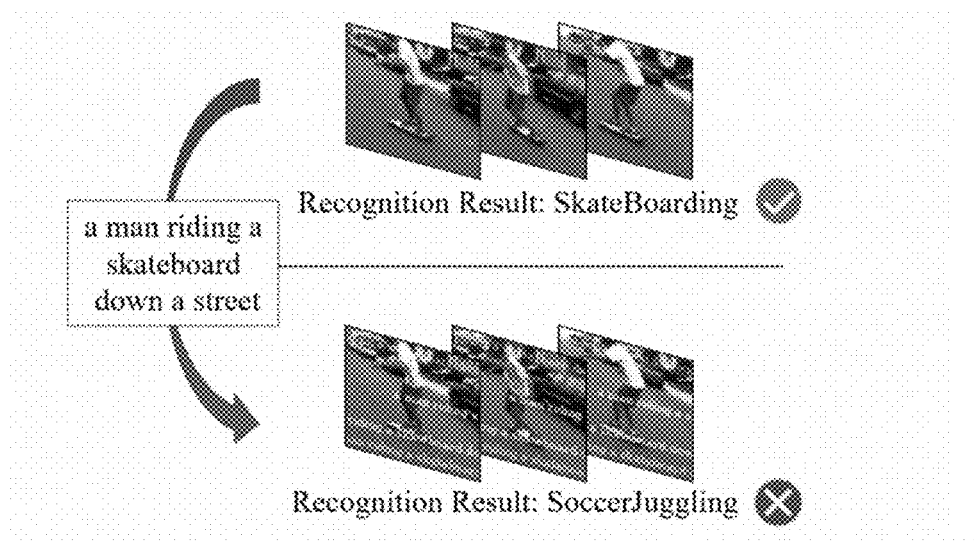
FIG. 1 illustratively shows an example of the adversarial BSC attack according to one embodiment of this invention.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

FIG. 1 illustratively shows an example of the adversarial BSC attack according to one embodiment of this invention. As can be seen, the few BSCs do not affect our understanding of the video but fool the video recognition model successfully.

Figure 2:
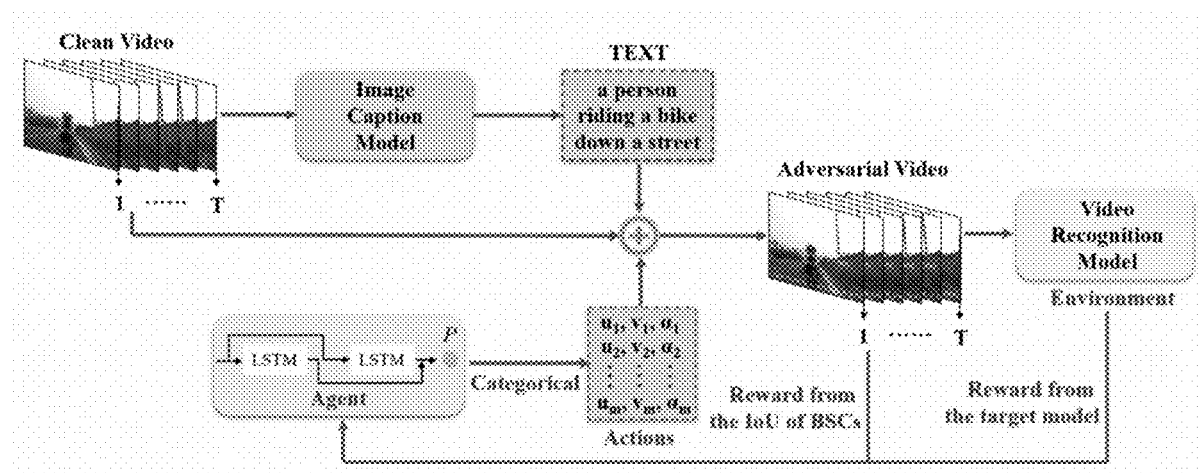
FIG. 2 illustratively shows the proposed attack framework in one embodiment of this invention.

FIG. 2 illustratively shows the proposed attack framework in one embodiment of this invention. Given a clean video sample, the content of BSCs is generated by an image captioning model. Then the position and transparency of BSCs are optimized through RL, where the agent adjusts the positions and transparencies according to two rewards (fooling rate and IoU between different BSCs) received from the environment (target model). By continuously querying the target model, the optimal positions and transparencies are selected to generate the video adversarial example. For the agent, it is to use a combination of a Long-Short Term Memory network (LSTM) and a fully connected (FC) layer.

As BSCs are quite popular when viewers watch videos online, people will be less sensitive to such meaningful patches than the rectangular patches used in patch-based image attacks. To make the BSCs attached to each video different from each other, an image captioning model is introduced to automatically generate BSCs.

The video recognition model is denoted as a function $F(\cdot)$, where $\theta F$ denotes the model parameters. Given a clean video sample $x \in X \subset R^{T \times W \times H \times C}$, where X is the video space, T, W, H, C denote the number of frames, frame width, frame height, and the number of channels respectively. For x, the associated ground-truth label $y \in Y = \{1, 2, \ldots, K\}$, where Y is the label space, K denotes the number of classes.

Here it is to use $F(x): X \rightarrow Y$ to denote the prediction of the video recognition model $F(\cdot)$ for an input video x. The goal of adversarial attacks on video models is to generate an adversarial video xadv that can fool the video recognition model. There are two types of adversarial attacks: untargeted attacks and targeted attacks. Untargeted attacks make $F(xadv) \neq y$, while targeted attacks make $F(xadv) = yadv$, where $yadv \neq y$. In the case of untargeted attacks, the following objective function is optimized:

$$\arg\min xadv - l(1y, F(xadv)). \quad (1)$$

where 1y is the one-hot encoding of the ground truth label, $l(\cdot)$ is the loss between the prediction and the ground truth label. In perturbation-based attacks, xadv is generated by modifying each pixel of the clean video, and the modification is constrained to have a small Lp norm. In contrast, the only constraint for patch-based attacks is that the modification must be confined to a small region.

In this invention, adversarial patches are disguised as meaningful BSCs to achieve stealthiness. Specifically, the BSCs are confined to a sequence of regions within the video frames $\epsilon = \{\epsilon 1, \ldots, \epsilon t, \ldots, \epsilon T\}$, where $\epsilon t$ denotes the region of BSCs (i.e., the set of pixels belonging to the region of BSCs) in the t-th frame. $\epsilon t$ can be determined by giving the horizontal coordinate u and vertical coordinate v of the BSC's position in the first frame, the font size h, and the font type T. Hence, the process of determining the i-th BSC's region in the first frame can be formalized as $\epsilon i1 = R(T\ EXT, ui, vi, h, T), i \in \{1, \ldots, m\}$, where $R(\cdot)$ is the function that determines the region of BSCs in the video frames, T EXT is the content of BSCs generated by the image captioning model, m is the number of BSCs. To implement the BSCs floating from right to left across the video, we translate $\epsilon t$ along the horizontal axis to get the region of BSCs in the t+1-th frame. Thus, we have $\epsilon^i_{t+1} = R(T\ EXT, ui-t, vi, h, T), i \in \{1, \ldots, m\}$.

To further mitigate the effect of BSCs on the video content, it is to use alpha blending to generate BSCs. When $(i, j) \in \epsilon t$, the generation for xadv is formulated as:

$$xadv(t,i,j) = (p^* \alpha + x(t,i,j)^*(255-\alpha))/255. \quad (2)$$

On the contrary, when $(i, j) \notin \epsilon t$, xadv is formulated as:

$$xadv(t,i,j) = x(t,i,j), \quad (3)$$

where (t, i, j) represents the position of the pixel in the video, p represents the padding of the BSCs' region which is the color of the BSCs, $\alpha$ represents the value of the BSC's alpha channel which refers to the transparency of BSC's region w.r.t. the video background.

In embodiments of this invention, it is to only focus on optimizing the position and transparency of the BSC, instead of the color and rotation, etc.

Here BSCs are used as adversarial patches, and the generation of video adversarial examples is only related to the position and transparency of BSCs. Searching over the position and transparency of BSCs can be formulated as an RL problem, since RL is demonstrated to be much more effective and efficient than random search strategies.

In the RL framework, the agent learns to select the position and transparency of adversarial BSCs by interacting with an environment that provides the rewards and updating its actions to maximize the total expected reward. In this invention, the environment consists of x and F(•), and an agent A is trained to sequentially search the position and transparency of BSCs. The searching space of BSCs' potential position and transparency is defined as:

$$S=\{u1,v1,\alpha1 \ldots ,ui,vi,\alpha i \ldots ,um,vm,\alpha m\},$$

$$ui \in [-w,W], \; vi \in [0, H-h], \; \alpha i \in [127,255]. \quad (4)$$

where w is the width of the BSC, which depends on the content of the BSC. From Equation 4, it can be observed that S has 3m dimensions, the agent A is set to take 3m actions in sequence to generate a∈S and a={a1, ..., a3m}. Here the agent A is defined to be a LSTM topped with a FC layer, its parameters are denoted by θA. The generation of actions is formulated as:

$$a0=0, \quad (5)$$

$$P=1, \quad (6)$$

$$ht=\text{LSTM}(ht-1,\text{Embedding}(at-1)), \; t=\{1, \ldots ,3m\}. \quad (7)$$

$$p(at|(a1, \ldots ,at-1))=\text{softmax}(\theta W \times ht). \quad (8)$$

$$at=\text{Categorical}(p(at|(a1, \ldots ,at-1))). \quad (9)$$

$$P=P \cdot p(a1, \ldots ,at-1)). \quad (10)$$

where the initial input a0 is set as 0, the hidden state $ht \in R$ 30 of LSTM evolves over step t, θW represents the weight of the FC layer. The FC layer that ends with the sigmoid function predicts the probability distribution p(at|(a1, ..., at−1)) over the possible actions for step t, and then one action at are sampled via a Categorical function and records the probability of the sampled action with P. The generated at is fed back into LSTM in the next step, which drives the LSTM state transition from ht to ht+1. This process is repeated until a complete action of 3m steps has been drawn.

To generate adversarial and non-overlapping BSCs, here it is to define a reward that contains two components: the reward from the feedback of the target model rattack and the reward from the IoU between different BSCs rIoU. The reward rattack and rIoU complement each other and work jointly to guide the learning of the agent:

$$r=\text{rattack}+\lambda \cdot rIoU. \quad (11)$$

The hyperparameter λ is set according to the parameter tuning which will be discussed later. The former reward rattack makes the agent generate actions with a higher loss of the target model and is defined as:

$$\text{rattack}=\log(1-1y \cdot F(xadv)). \quad (12)$$

The reward rIoU avoids significantly obscuring the details of the video due to the overlap of BSCs, which is defined as:

$$rIoU=-IoU(\epsilon). \quad (13)$$

IoU(•) calculates the intersection area over the union area between different BSCs. In this way, rIoU not only constrains the overlap between BSCs but also implicitly constrains the number of BSCs by regarding adversarial examples with overlapping BSCs as failures. Based on this reward, the agent A is expected to generate non-overlapping BSCs while successfully attack video recognition models.

Then, it is to employ the REINFORCE algorithm (Williams, "Simple statistical gradient-following algorithms for connectionist reinforcement learning", Machine learning, 1992) to optimize the parameters θA of the agent A by maximizing the expected reward J(θA)=EP [r]:

$$\nabla_{\theta_A} J(\theta_A) = \frac{1}{B} \sum_{n=1}^{B} \nabla_{\theta_A} r_n \log P_n, \quad (14)$$

where B is the batch size and is set as 500. The parameters are optimized via Adam with a learning rate of 0.03.

The overall process of the adversarial BSC attack according to this invention is summarized in Algorithm 1 (see infra.). To enable automatically generate different BSCs for each video, a pre-trained image captioning model I(•) takes the first frame of clean video x[0] as input and outputs the description that used as the BSC. Then, the agent generates an action sequence including position coordinates and transparency of m BSCs, based on which the BSCs can be attached to the video and the rewards are calculated to optimize the agent finally. The attack process is repeated until the adversarial BSC with rIoU=0 is found, or the attack fails because the maximum query number is exceeded. Note that if there is more than one adversarial example with rIoU=0 in the batch, it is to then select the one with the least salient region occluded by the BSCs. Intuitively, salient regions, for example, the foreground of the frames, have a high probability to be the human's focus area. Generating adversarial BSCs on the salient regions will be more likely to affect people's understanding of the video content.

---

Algorithm 1: Adversarial BSC attack

Input : video recognition model F(·), clean video x, ground-truth label y.
Output : adversarial video $x_{adv}$.
Parameter: the number of BSCs m, the font size h, the balancing factor λ, the font type 𝕋.
1 for i = 1 to epochs do
2 | TEXT = I(x|0|) ;
3 | α, P = 𝔸 (0) ;
4 | for t = 0 to T − 1 do
5 | | $\epsilon_{t+1}^m$ =R(TEXT, $u_i$ − t, $v_i$, h, 𝕋), i ∈
 | | {1, ..., m} ;
6 | | if (i, j) ∈ $\epsilon_{t+1}$ then
7 | | | $x_{adv}$(t + 1, i, j) =
 | | | (p * α + x(t + 1, i, j) * (255 − α))/255
8 | | else
9 | | | $x_{adv}$(t + 1, i, j) = x(t + 1, i, j)
10 | | end
11 | end
12 | $r_{attack}$ = log(1 − $1_y$ · F($x_{adv}$)) ;
13 | $r_{IoU}$ = −IoU(ε) ;
14 | r = rattack + λ$r_{IoU}$ ;
15 | Update the agent 𝔸 .
16 end
17 return $x_{adv}$

---

Experiments

The approach of this invention is implemented on a workstation with four GPUs of NVIDIA GeForce RTX 2080 Ti.

Two popular benchmark datasets for video recognition are used: UCF-101 (Su et al., "UCF-101, a novel Omi/HtrA2 inhibitor, protects against cerebral ischemia/reperfusion injury in rats", *The Anatomical Record: Advances in Integrative Anatomy and Evolutionary Biology*, 2009) and HMDB-51 (Kuehne et al., "HMDB: a large video database for human motion recognition", IEEE International conference on computer vision, 2011). UCF-101 is an action recognition dataset collected from YouTube, which contains 13,320 videos with 101 action categories. HMDB-51 is a dataset for human motion recognition and contains a total of 7000 clips distributed in 51 action classes. Both datasets split 70% of the videos as training set and the remaining 30% as test set. It is to randomly sample 2 videos from each category of the test dataset. During the test, 16-frame snippets are uniformly sampled from each video as input of target models. Note that, the sampled video snippet can all be classified correctly by target models.

In this invention the target models are three video recognition models: Longterm Recurrent Convolutional Network (LRCN) (Donahue et al., "Long-term recurrent convolutional networks for visual recognition and description", IEEE conference on computer vision and pattern recognition, 2015), C3D (Hara et al., "Can spatiotem-poral 3d cnns retrace the history of 2d cnns and imagenet?", IEEE conference on Computer Vision and Pattern Recognition, 2018) and I3DSlow (Feichtenhofer et al., "Slowfast networks for video recognition", IEEE/CVF international conference on computer vision, 2019). LRCN exploits the temporal information contained in successive frames, with Recurrent Neural Networks (RNNs) capturing long-term dependencies on the features generated by Convolutional Neural Networks (CNNs). In the invention, Inception V3 (Szegedy et al., see supra.) pre-trained on ImageNet is utilized to extract features from video frames and LSTM is utilized for video recognition; C3D applies 3D convolution to learn spatio-temporal features from videos with spatio-temporal filters for video recognition; I3D-Slow preserves the slow pathway, which operates at the low frame rate and captures spatial semantics in the SlowFast framework. These three models are the mainstream methods for video recognition. On UCF-101, the recognition accuracies for C3D, LRCN and I3DSlow are 85.88%, 64.92% and 63.39% respectively, while on HMDB-51, the recognition accuracies are 59.95%, 37.42% and 34.9% respectively.

For simplicity and efficiency, here it is to adopt an attention-based image captioning model (Xu et al., "Show, attend and tell: Neural image caption generation with visual attention", International conference on machine learning, 2015) that is pre-trained on Microsoft Common Objects in Context (MS COCO) (Lin et al., "Microsoft coco: Common objects in context", European conference on computer vision, 2014) to automatically generate the description for the first frame of videos.

Three metrics are used to evaluate the performance of the method of this invention on various sides.

1) Fooling rate (F R): the ratio of adversarial videos that are successfully misclassified;

2) Average occluded area (AOA): the average area percentage occluded by BSCs in the entire video. Here AOA* is used to denote the average area percentage occluded by BSCs in the salient region; and 3) Average query number (AQN): the average number of querying the target models to finish the attacks.

A large number of experiments are conducted to determine four hyperparameters in Algorithm 1, including the number of BSCs m, the font size h, the balancing factor $\lambda$ in the reward, and the font type T. It is to evaluate the attack performance of the algorithm of this invention on the C3D model with different hyperparameters. For the evaluation, it is to randomly sample 1 video per category from the test set of UCF-101. The sampled videos can be correctly classified by the C3D model. Then, a grid search is conducted to find the most appropriate values for these four hyperparameters.

Table 1 and Table 2 show the attack performance with different number of BSCs (effects of the number of BSCs m) and different font sizes effects of the font size h), respectively. The results show that when the number of BSCs m increases, the AOA will increase while the F R will firstly increase and then decrease. When the font size h increases, AOA and F R show a similar trend. That is, as the number of BSCs or the font size increases, more areas in the video are occluded, hence achieves a higher fooling rate. However, since the adversarial examples with overlapping BSCs are regarded as failures, BSCs are more likely to overlap when the number of BSCs or the font size increases. To strike a balance between F R, AOA and AQN, we set m=4 and h=9 to conduct subsequent experiments.

TABLE 1

| m | FR(%) | AOA(%) | AOA*(%) | AQN |
|---|---|---|---|---|
| 2 | 68.3 | 4.1 | 1.5 | 9084 |
| 3 | 72.3 | 5.5 | 1.8 | 8089 |
| 4 | 79.2 | 7.3 | 2.4 | 7005 |
| 5 | 79.2 | 8.9 | 3.0 | 7292 |
| 6 | 73.3 | 10.0 | 3.5 | 8233 |

TABLE 2

| h | FR(%) | AOA(%) | AOA*(%) | AQN |
|---|---|---|---|---|
| 7 | 78.2 | 7.1 | 2.3 | 7193 |
| 8 | 79.2 | 7.3 | 2.4 | 7005 |
| 9 | 80.2 | 7.6 | 2.5 | 6718 |
| 10 | 81.2 | 8.4 | 2.8 | 6544 |
| 11 | 82.1 | 9.2 | 3.0 | 6263 |
| 12 | 81.2 | 10.6 | 3.7 | 6322 |
| 13 | 76.2 | 10.6 | 3.8 | 7441 |

Table 3 shows the attack performance with different balancing factors in the reward (effect of the balancing factor $\lambda$). As can be seen from the table, when $\lambda$ increases, F R decreases slightly while AOA remains relatively stable. That is, when the reward rIoU has a larger weight, the model tends to make the generated BSCs non-overlap rather than optimize the attack success rate, hence results in a lower fooling rate. Therefore, it is to set $\lambda=1e-3$ so that adversarial BSC attack can achieve the highest F R (%) and the least AQN.

TABLE 3

| $\lambda$ | FR(%) | AOA(%) | AOA*(%) | AQN |
|---|---|---|---|---|
| $1e^{-5}$ | 79.2 | 7.7 | 2.6 | 7253 |
| $1e^{-4}$ | 80.2 | 7.8 | 2.5 | 6970 |
| $1e^{-3}$ | 80.2 | 7.6 | 2.5 | 6718 |
| $1e^{-2}$ | 78.2 | 7.5 | 2.6 | 7169 |
| $1e^{-1}$ | 76.2 | 7.8 | 2.6 | 7579 |

Table 4 shows the attack performance with different DejaVu font types (effect of the font type T). According to the results, it is to set T=DejaV uSerif to achieve the best attack performance for the adversarial BSC attack.

TABLE 4

| T | FR(%) | AOA(%) | AOA*(%) | AQN |
|---|---|---|---|---|
| DejaVuSans | 78.2 | 7.5 | 2.4 | 7426 |
| DejaVuSerif | 80.2 | 7.6 | 2.5 | 6718 |
| DejaVuSansMono | 76.2 | 7.3 | 2.3 | 7753 |

TABLE 4-continued

| T | FR(%) | AOA(%) | AOA*(%) | AQN |
|---|---|---|---|---|
| DejaVuSansCondensed | 69.3 | 9.0 | 3.1 | 8797 |
| DejaVuSerifCondensed | 67.3 | 8.8 | 3.0 | 9534 |

The method of this invention is compared with PatchAttack (Yang et al., "Patchattack: A black-box texture-based attack with re-inforcement learning", European Conference on Computer Vision, 2020), which is originally proposed to attack image classification models in the black-box setting. Since BSCs are usually in white and untextured, for a fair comparison, only consider the white square patch is considered in the comparison. Different from the original setting of PatchAttack, here PatchAttack is extended to attack video models by selecting the position and transparency of a white square patch with the same area as m BSCs via RL.

Besides, two variants of our method are also compared. One variant uses Basin hopping (BH) (Wales and Doye, "Global optimization by basin-hopping and the lowest energy structures of Lennard-Jones clusters containing up to 110 atoms", The Journal of Physical Chemistry, 1997) instead of RL to search over the position and transparency of BSCs. BH is a stochastic optimization algorithm that can be used to find the global minimum of a multivariate function. During each iteration, BH generates several new variables with random perturbation, then finds the local minimization, and finally accepts or rejects the new variables according to the minimized function value. The other variant randomly selects the position and transparency of the BSCs. For a fair comparison, it is to set the number of random trials equal to the query numbers of our method based on RL.

Table 5 lists the performance comparison against different target models on UCF-101 dataset and HMDB-51 dataset.

TABLE 5

| Dataset | Target Model | Attack Method | Metrics | | | |
|---|---|---|---|---|---|---|
| | | | FR (%) | AOA (%) | AOA* (%) | AQN |
| UCF-101 | C3D | PatchAttack (Yang et al. 2020) | 73.3 | 16.9 | 5.7 | 7299 |
| | | Our method (BH) | 65.8 | 8.8 | 2.9 | 10473 |
| | | Our method (RL) | 90.1 | 7.5 | 2.5 | 4273 |
| | | Our method (Random) | 68.8 | 9.0 | 3.5 | — |
| | LRCN | PatchAttack (Yang et al. 2020) | 97.4 | 14.0 | 2.6 | 1166 |
| | | Our method (BH) | 97.4 | 8.5 | 2.8 | 1335 |
| | | Our method (RL) | 99.5 | 5.5 | 1.0 | 1673 |
| | | Our method (Random) | 97.4 | 8.6 | 2.8 | — |
| | I3D-Slow | PatchAttack (Yang et al. 2020) | 92.1 | 14.6 | 4.6 | 2480 |
| | | Our method (BH) | 90.1 | 8.2 | 2.7 | 3468 |
| | | Our method (RL) | 96.5 | 5.8 | 1.9 | 1673 |
| | | Our method (Random) | 89.6 | 8.2 | 2.8 | — |
| HMDB-51 | C3D | PatchAttack (Yang et al. 2020) | 92.2 | 13.5 | 3.5 | 2500 |
| | | Our method (BH) | 81.4 | 8.2 | 2.7 | 6358 |
| | | Our method (RL) | 91.2 | 6.4 | 1.5 | 3122 |
| | | Our method (Random) | 83.3 | 8.8 | 3.2 | — |
| | LRCN | PatchAttack (Yang et al. 2020) | 96.9 | 12.1 | 1.6 | 1250 |
| | | Our method (BH) | 94.9 | 8.2 | 2.6 | 1617 |
| | | Our method (RL) | 99.0 | 4.8 | 0.7 | 980 |
| | | Our method (Random) | 93.9 | 8.0 | 2.5 | — |
| | I3D-Slow | PatchAttack (Yang et al. 2020) | 100.0 | 11.5 | 3.5 | 760 |
| | | Our method (BH) | 91.1 | 8.5 | 2.8 | 3453 |
| | | Our method (RL) | 99.0 | 4.8 | 1.6 | 949 |
| | | Our method (Random) | 98.0 | 7.8 | 2.6 | — |

From the results, it can be observed that 1) first, compared to PatchAttack, the method of this invention that uses BSCs as adversarial patches significantly reduces the occluded area; for all models, the occluded area has been reduced by more than 52% on both datasets; it is not surprising that BSCs have much smaller occluded areas since compared to a square patch, BSCs are more scattered;

2) second, compared to BH, RL is more effective in reducing the number of queries; for C3D and LRCN models, the number of queries has been reduced by more than 22% on both datasets; besides, RL achieves better performance than random selection under the same query numbers; and 3) third, in most cases, BSCs occlude wider range contents of video than a square patch with the same area and hence increases the fooling rate. Similar results are obtained by conducting experiments on Kinetics-400 (Kay et al., "The kinetics human action video dataset", arXiv preprint arXiv:1705.06950, 2017) dataset.

In summary, using BSCs as adversarial patches decreases the occluded areas and RL helps to achieve a more effective and efficient attack.

Figure 3:
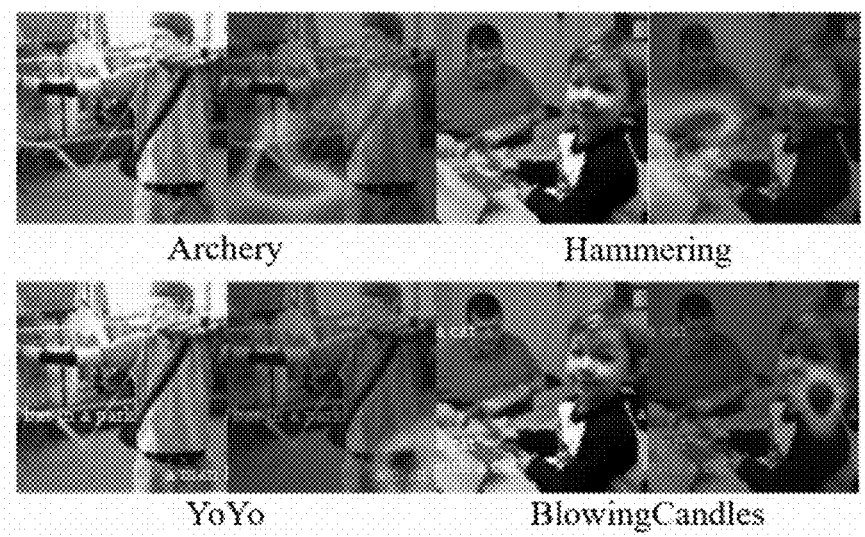
FIG. 3 illustrative shows two examples of adversarial frames generated by the BSC attack method on UCF-101 dataset according to one embodiment of this invention.

FIG. 3 shows two examples of adversarial frames generated by our proposed BSC attack method on UCF-101 dataset, wherein the top row is the clean frames and their corresponding heatmaps, and the bottom row is the adversarial frames and their corresponding heatmaps.

In addition, it is to further visualize the discriminative regions in the video frames for the C3D model with Gradient-weighted Class Activation Mapping (Grad-CAM) (Selvaraju et al., "Grad-cam: Visual explanations from deep networks via gradient-based localization", IEEE international conference on computer vision, 2017). From the generated heatmaps, it is clear why the C3D model predicts the input frames as the corresponding correct classes. And embedding the adversarial BSCs into the frame can modify the distribution of the maximum points on the generated heatmap.

To qualitatively evaluate the risks of adversarial patches prone to spot, it is to use a visual saliency map to show the human-simulated focus area when they take a glance at the image. The BSCs are compared with the square patch, including the original frame as the baseline. Note that both patches occluded the same area of frame for fairness.

Figure 4:
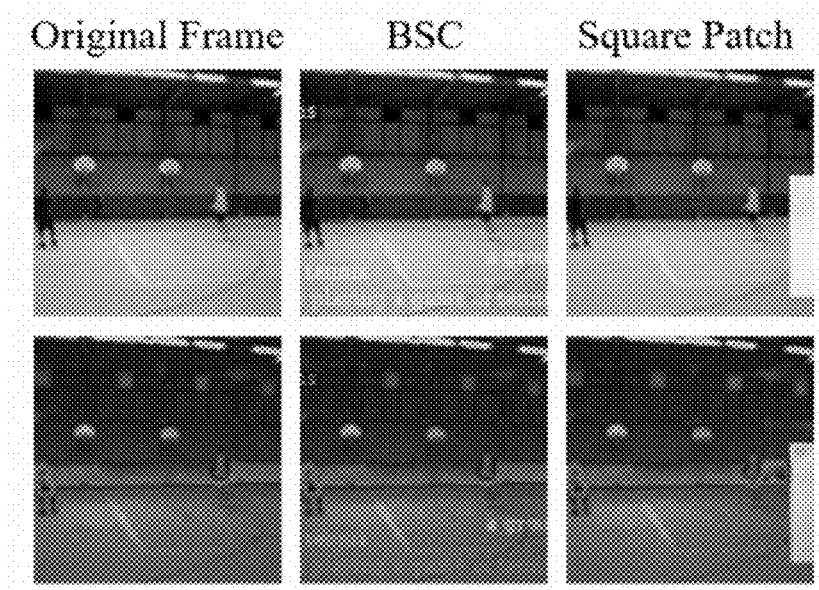
FIG. 4 illustratively shows examples of saliency detection for adversarial patches according to one embodiment of this invention.

FIG. 4 illustratively shows examples of saliency detection for adversarial patches. It can be seen that our BSC does not trigger the saliency detection significantly, and see that the square patch can be easily highlighted in the saliency map. This means adversarial patches have a high probability to be spotted at people's first glance. In contrast, the BSCs are relatively inconspicuous under human observation at first glance. Besides, even if they are detected, BSCs are less likely to arouse people's suspicion than square patches.

It is also to evaluate the performance of the attack method of this invention against the patch-based defense method—Local Gradient Smoothing (LGS) (Naseer et al., "Local gradients smoothing: Defense against localized adversarial attacks", IEEE Winter Conference on Applications of Computer Vision, 2019). LGS has shown the best adversarial accuracy on the ImageNet dataset against patch-based attacks among the studied patch defenses to date (Chiang et al., "Certified defenses for adversarial patches", arXiv preprint arXiv:2003.06693, 2020). In order to evaluate the robustness of adversarial patches with different types, it is to compare the performance of BSCs and a square patch against LGS defense in terms of the fooling rate. Since the approach is designed for images, the LGS defense operation is applied for each frame in the video.

Table 6 shows the attack performance of the i=method of this invention against the LGS defense. From Table 6, it is clear that the BSCs are more robust than the square patch against the LGS defense method. Since adversarial training is difficult to apply on videos, an intuitively effective defense method against our BSC attack is to use strong text removal techniques to detect and remove BSCs.

TABLE 6

| Dataset | Target Model | Type of Patch | FR(%) |
|---|---|---|---|
| UCF-101 | C3D | BSC | 67.9 |
| | | White Square Patch | 54.2 |
| | LRCN | BSC | 81.7 |
| | | White Square Patch | 75.5 |
| | I3D-Slow | BSC | 84.7 |
| | | White Square Patch | 65.0 |
| HMDB-51 | C3D | BSC | 70.7 |
| | | White Square Patch | 59.8 |
| | LRCN | BSC | 88.3 |
| | | White Square Patch | 75.5 |
| | I3D-Slow | BSC | 93.9 |
| | | White Square Patch | 67.3 |

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A method for generating adversarial attacks on a video recognition model, comprising:
(a) generating content of bullet-screen comments (BSCs) by an image captioning model for a clean video sample;
(b) generating an adversarial video sample by inserting the BSCs into the clean video sample;
(c) using the adversarial video sample to attack the video recognition model;
(d) receiving a fooling rate from the video recognition model and an Intersection over Union (IoU) between different BSCs;
(e) optimizing position and transparency of the BSCs by a reinforced learning (RL) agent according to the received fooling rate and the IoU; and
(f) updating the adversarial video sample and using it to attack the video recognition model;
iteratively repeating steps of (d)-(f), until the IoU between the BSCs in the adversarial video sample equals to 0.

2. The method of claim 1, wherein the BSCs are confined to a sequence of regions within the video frames of the clean video sample.

3. The method of claim 1, wherein the position of each of the BSCs are defined by a horizontal coordinate, a vertical coordinate, a font size, and a font type of the respective BSC.

4. The method of claim 1, wherein the generation of the adversarial video sample is only related to the position and transparency of the BSCs, other than the color and rotation of the BSCs.

5. The method of claim 4, wherein the agent is trained to sequentially search the position and transparency of BSCs.

6. The method of claim 1, wherein the IoU constrains the overlap between the BSCs, as well as the number of BSCs, by regarding adversarial examples with overlapping BSCs as failures.

7. The method of claim 1, wherein the agent is a combination of a Long-Short Term Memory network (LSTM) and a fully connected (FC) layer.

8. The method of claim 7, wherein the agent is set as a LSTM topped with a FC layer.

9. A method for generating adversarial attacks on a video recognition model, comprising:
(a) generating content of bullet-screen comments (BSCs) by an image captioning model for a clean video sample;
(b) generating an adversarial video sample by inserting the BSCs into the clean video sample;
(c) using the adversarial video sample to attack the video recognition model;
(d) receiving rewards from the environment;
(e) optimizing position and transparency of the BSCs by a reinforced learning (RL) agent according to the received rewards; and
(f) updating the adversarial video sample and using the adversarial video sample to attack the video recognition model;
iteratively repeating steps of (d)-(f), until a predefined condition is matched.

10. The method of claim 9, wherein the agent learns to optimize the position and transparency of adversarial BSCs by interacting with the environment and updating the agent's actions to maximize the total expected reward.

11. The method of claim 9, wherein the rewards from the environment includes feedback from the video recognition model, and an Intersection over Union (IoU) between different BSCs.

12. The method of claim 11, wherein the feedback from the video recognition model is the fooling rate.

13. The method of claim 9, wherein the BSCs are confined to a sequence of regions within the video frames of the clean video sample.

14. The method of claim 9, wherein the position of each of the BSCs are defined by a horizontal coordinate, a vertical coordinate, a font size, and a font type of the respective BSC.

15. The method of claim 9, wherein the step of generating an adversarial video sample comprises varying the position and transparency of the BSCs, and not varying the color or rotation of the BSCs.

16. The method of claim 15, wherein the agent is trained to sequentially search the position and transparency of the BSCs.

17. The method of claim 11, wherein the IoU constrains the overlap between the BSCs, as well as the number of BSCs, by regarding adversarial examples with overlapping BSCs as failures.

18. The method of claim 9, wherein the agent is a combination of a Long-Short Term Memory network (LSTM) and a fully connected (FC) layer.

19. A system for generating adversarial attacks on a video recognition model, comprising:
- a content generating module generating content of bullet-screen comments (BSCs) by an image captioning model for a clean video sample;
- an adversarial video sample generating module generating an adversarial video sample by inserting the BSCs into the clean video sample; and
- an iterative attacking module iteratively repeating steps as follows:
- attacking the video recognition model by using the adversarial video sample;
- receiving a fooling rate from the video recognition model and an Intersection over Union (IoU) between different BSCs;
- optimizing the position and transparency of the BSCs by a reinforced learning (RL) agent according to the received fooling rate and the IoU; and
- updating the adversarial video sample;
- wherein the iterative attacking module repeating the above steps until the IoU between the BSCs in the adversarial video sample is equal to 0.

20. A system for generating adversarial attacks on a video recognition model, comprising:
- a content generating module generating content of bullet-screen comments (BSCs) by an image captioning model for a clean video sample;
- an adversarial video sample generating module generating an adversarial video sample by inserting the BSCs into the clean video sample;
- an iterative attacking module iteratively repeating the following steps:
- attacking the video recognition model by using the adversarial video sample;
- receiving rewards from an environment;
- optimizing position and transparency of the BSCs by a reinforced learning (RL) agent according to the received rewards;
- updating the adversarial video sample and using the adversarial video sample to attack the video recognition model;
- wherein the iterative attacking module repeats the above steps until a predefined condition is matched.

* * * * *